US005742921A

United States Patent [19]

Oo et al.

[11] Patent Number: 5,742,921

[45] Date of Patent: Apr. 21, 1998

[54] AUTOMATIC SELF-CALIBRATION METHOD FOR POSITION ENCODER

[75] Inventors: Kah Seng Oo, Farmington Hills; Paul Michael Suzio, Livonia, both of Mich.

[73] Assignee: Ford Motor Company, Dearborn, Mich.

[21] Appl. No.: 642,986

[22] Filed: May 6, 1996

[51] Int. Cl.$^{6}$ .............................. F02D 41/04; G01B 7/30

[52] U.S. Cl. ................ 701/102; 123/339.25; 364/571.01

[58] Field of Search .................................... 701/101, 102; 364/571.01, 571.07; 123/376, 361, 399, 339.14, 339.25; 324/207.25

[56] References Cited

U.S. PATENT DOCUMENTS

| | | | |
|---|---|---|---|
| 4,912,468 | 3/1990 | Rust | 341/119 |
| 5,033,431 | 7/1991 | Poirier et al. | 123/339 |
| 5,489,845 | 2/1996 | Weber et al. | 324/207.25 |
| 5,568,386 | 10/1996 | Sugiura et al. | 364/424.1 |
| 5,619,112 | 4/1997 | Younessi et al. | 318/689 |

*Primary Examiner*—Michael Zanelli

*Attorney, Agent, or Firm*—Peter Abolins

[57] ABSTRACT

This invention includes the method of calibrating an inductance position encoder for a variable reluctance motor including the steps of selectively positioning the motor to predetermined positions, detecting the readings from position encoder and averaging the readings to define encoder position and to produce a calibration for the motor.

5 Claims, 3 Drawing Sheets

@ POINT C

AUTOMATIC SELF-CALIBRATION METHOD FOR POSITION ENCODER

BACKGROUND OF THE INVENTION

1. Field of the Invention

This invention relates to calibrating position encoders.

2. Prior Art

Because of manufacturing and component tolerances, and in order to provide high degree of resolution and accuracy, there is a need to calibrate each position sensor of an individual electronic throttle control unit module (TCU) using a motor to provide throttle rotation. One method of performing such a calibration is to attach a sensor/motor assembly to an accurate high resolution encoder such as an optical one and drive it either manually or through a motorized mechanical means via an electronic tester to collect and generate the data required. However, this method is costly, complex and time consuming.

Other known methods of calibrating an encoder include positioning the encoder to a known position and indicating that position as a reference voltage. However, as the demands on the accuracy of the position have increased in various applications, such methods are no longer adequate. Further, an encoder as described in U.S. Pat. No. 5,717,592, filed on Nov. 6, 1995, inventors K. Oo, C. Weber, D. Recker, and P. Suzio, and assigned to Ford Motor Company presents additional problems in calibration. These are some of the problems this invention overcomes.

SUMMARY OF THE INVENTION

This invention compensates for manufacturing and component tolerances to obtain high resolution and accuracy from an inductance position encoder. The motor and electronics self calibrate automatically, this eliminates any mechanical attachment problems such as radial misalignments which can cause inaccurate result. This is accomplished by calibrating the sensor to the electronics associated with the sensor. In some applications, the motor is designed specifically for flat torque and dual wound, and is not conducive to self-calibration. This invention provides a simplified and cost-effective way of auto self calibrating the inductance position encoder to the electronics in place of complex and expensive test equipment.

The invention includes the steps of selecting a motor phase in a motor of an encoder/motor combination. This phase is energized to move one of the rotor poles of the motor into alignment with one of the stator poles. The electrical degree value of each of the three phases of the encoder is read. Two motor phases are selected, and then energized to the rotor pole and an adjacent rotor pole into an intermediate position between the stator pole and an adjacent stator pole. The electrical degree value of each of the three phases of the encoder is read again. Now that two points have been established, for each of the three phases of the electrical wave functions of the encoder, the slope and offset for each of the three functions is calculated. This process is repeated until the electrical wave functions are fully defined. These functions are stored and used as a calibration reference for the encoder.

DETAILED DESCRIPTION OF THE INVENTION

Figure 1:
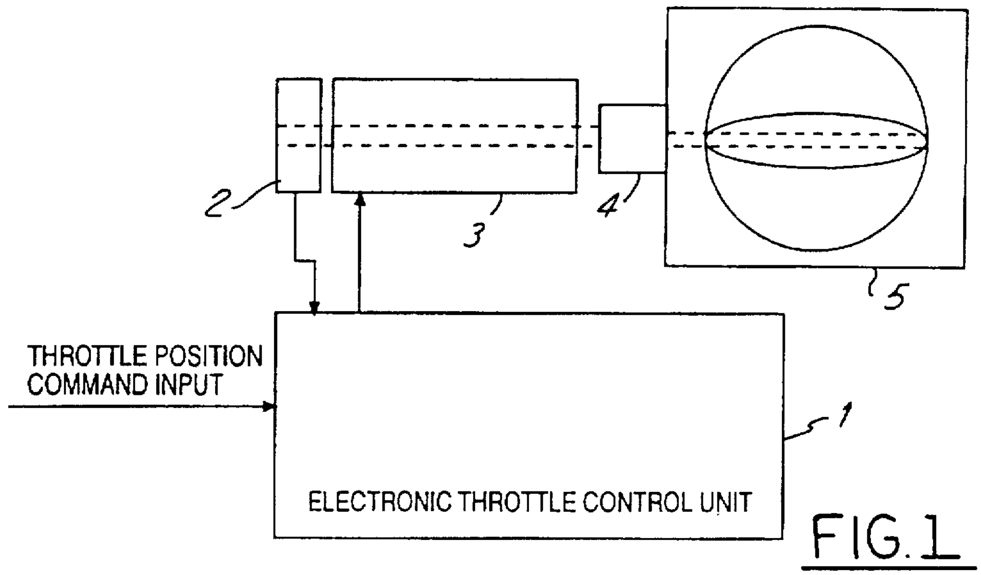
FIG. 1 is a block diagram of an electronic throttle control system including an inductance position encoder which can be auto self-calibrated in accordance with an embodiment of this invention.

Referring to FIG. 1, an electronic throttle control system has an electronic throttle control unit (TCU) 1, a motor 3 with an associated inductance position encoder (IPE) 2, a mechanical coupling 4 and a throttle body 5. Such an electronic throttle control system can use a motor to control the throttle plate of a motor vehicle.

Figure 4:
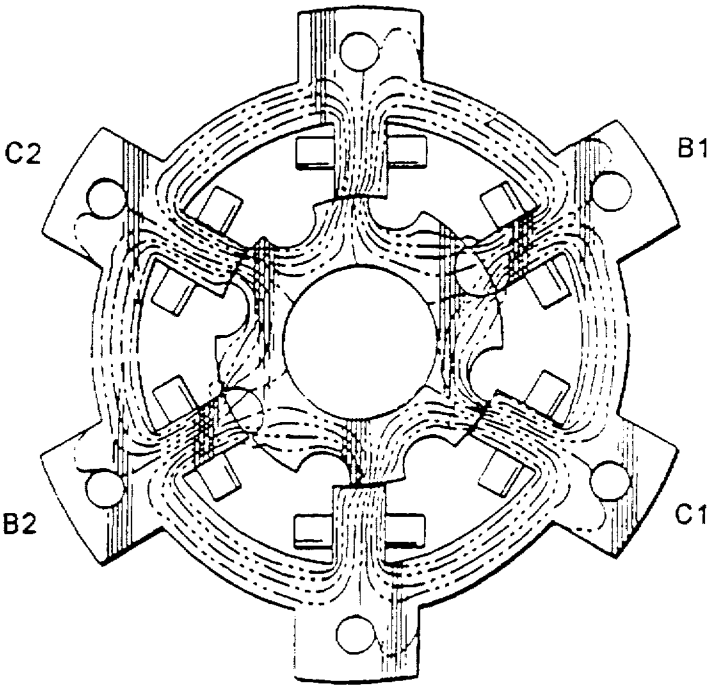
FIG. 4 is a cross section view of a motor mechanical structure.

The motor can be, for example, a single wound or a dual-wound three phase variable reluctance motor. When motor 3 is a dual wound motor it is designed with two side windings having a construction as shown in FIG. 4. The winding for side 1 (A1B1C1) and side 2 (A2B2C2) are wound as shown in FIG. 4 to provide an advantageously flat torque curve. Under normal operation, both sides are energized by two separate power circuits in TCU 1 to produce the total amount of torque desired. However, in the event that one side fails, (be it a power circuit or a motor winding), the failed side can be safely powered off without generating interfering magnetic poles. The other operating side can be controlled with half the total motor torque.

Figure 2:
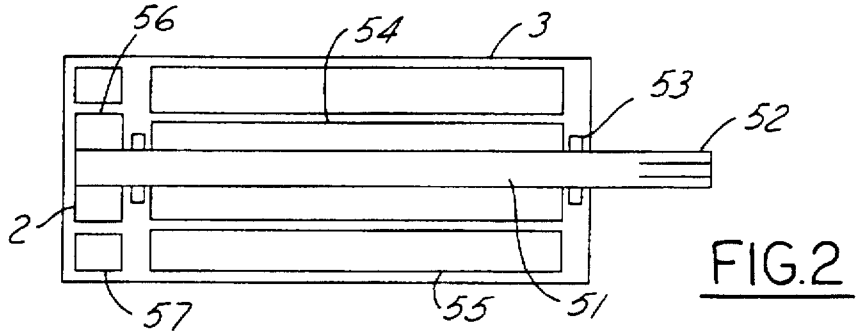
FIG. 2 is a longitudinal cross section of the motor and inductance encoder structure.

Referring to FIG. 2, motor 3 includes a motor shaft 51 having a gear 52 at one end being coupled to an inductance position encoder 2 at the other end. Bearings 53 support motor shaft 51. A motor rotor 54 is mounted on motor shaft 51 and a motor stator 55 is a generally angular member surrounding motor rotor 54. Similarly, inductance position encoder 2 has a inductance position encoder rotor 56 and an inductance position encoder stator 57.

Figure 3A:
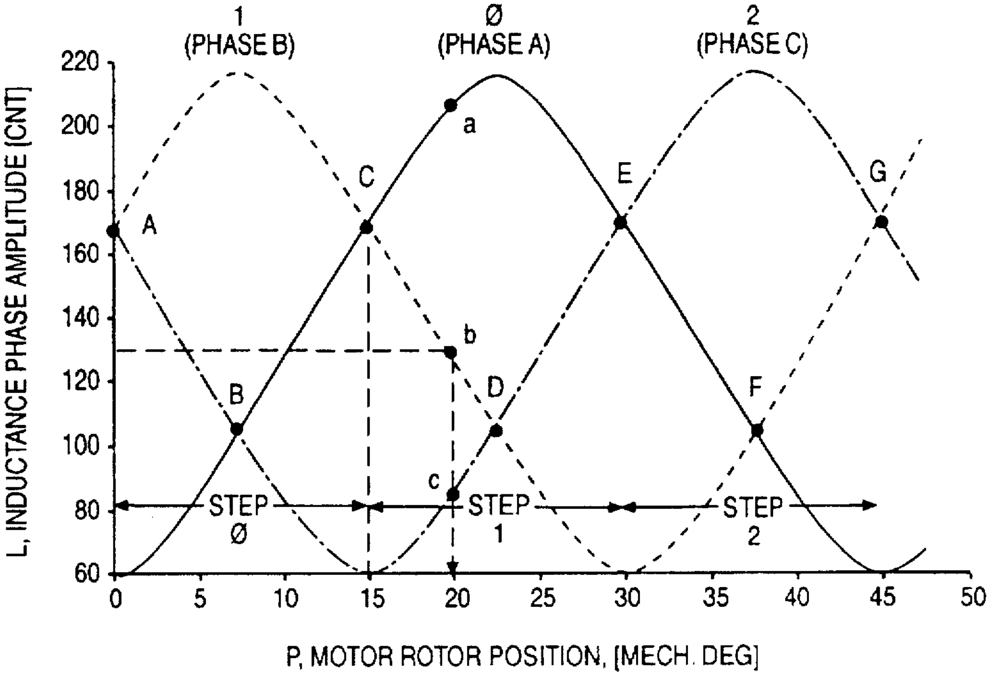
FIG. 3A is a graphic representation of encoder rotor position versus inductance phase amplitude.
Figure 3B:
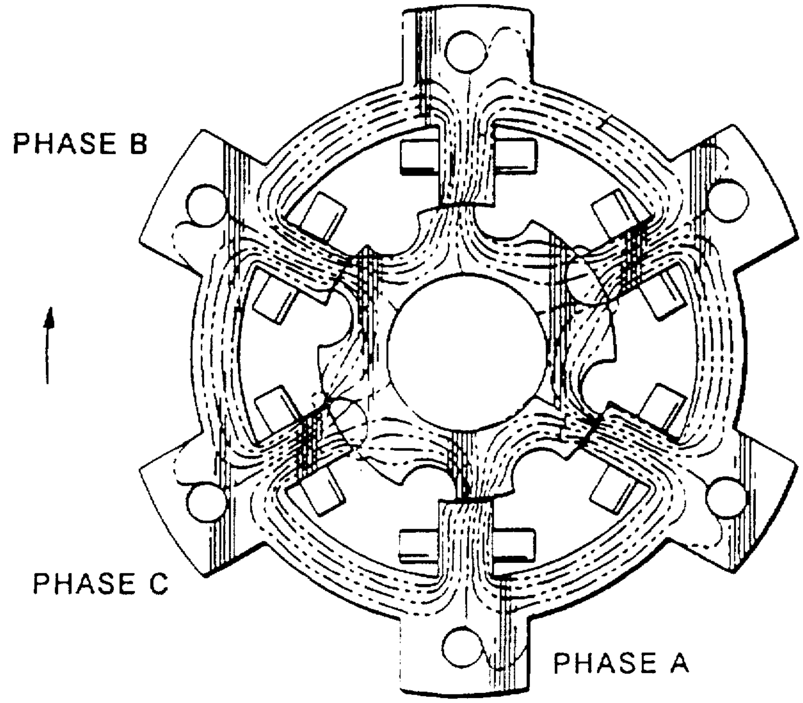
FIG. 3B is a cross section view of inductance position encoder mechanical structure.

Inductance postion encoder 2 has a mechanical and magnetic construction as shown in FIG. 3B. FIG. 3A shows the IPE signals, converted by the electronic hardware circuit in TCU 1 into three pseudo-sinusoidal waveforms as position phases A, B and C (or 0,1 and 2). To achieve very high resolution and to increase the computation efficiency, only the near linear regions are used. For example, line sections A-B, B-C, etc., are linearized into slopes ($m_1$) and offsets ($c_1$) during calibration process and stored into tables in the microcomputers memory in TCU 1. The motor rotor angular position $P_1$ within a step, is computed as:

$$P_1 = m_1 * Lm + C1$$

where $L_m$ is the middle value of the three inductance values, m1 is the slope of the linear inductance region, and c1 is the offset.

Each position phase is assigned a value of 0,1 and 2 representing phases A, B and C, respectively. The y-axis defined by points, A to B to C, is considered as a step, 1 (which is also used as the position table index). When the rotor moves through points A, B, and C to section C-D, the step and high position ordinance value Ph are incremented. And when it moves the opposite way, the step and the high position ordinance value are decremented. The total rotor position, $P_r$, is made up of the high ordinance value $P_h$ and the low ordinance value $P_1$. IPE 2 sensor is inserted at the motor shaft in a way to produce the three semi-sinusoidal waveforms synchronized with the inductance phase amplitude characteristics as shown in FIG. 3A.

The sequence of motor poles going in a clockwise direction starting at A1 is: A1, B1, C1, A2, B2, C2. In operation, non-adjacent poles are selected in the calibration technique. This special kind of motor having two coils per phase requires a special calibration technique. The motor and the sensor have similar construction to make this calibration technique possible. A half-step is defined as being ½ of 15 degrees or 7 ½ degrees for the particular motor design. In operation, selection is made from non-adjacent poles. First a forward half step is made from A1 to C1 and then a backward half step is made from A2 to C2. Then an average is taken. Next, a forward half step is taken from A1 to B2 and a backward step is taken from A2 to B1. Again, an average is made. A full step occurs when one phase is energized. A half-step occurs when two phases are energized. In the following sequence: BC, B, AB, A, AC, C, BC movements between adjacent poles such as BC to B or B to AB are half-steps. Movement between poles where the intermediate is skipped is a full step. That is, a movement from B to A is a full step. A movement from/LB to AC is a full step.

Figure 5:
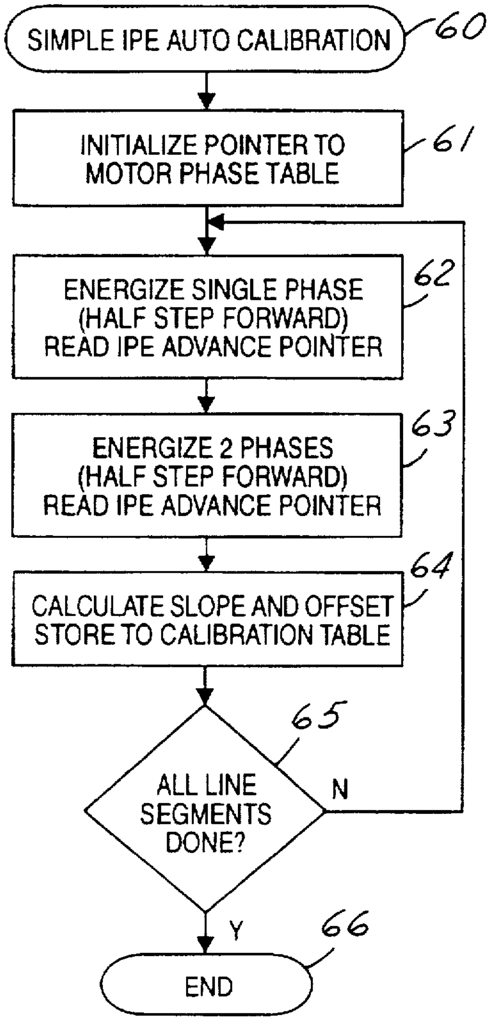
FIG. 5 is a logic flow diagram of a self auto-calibration method for a single wound motor in accordance with an embodiment of this invention.

For a single wound type of three phase motor, a scheme to calibrate IPE encoder 2, by half stepping the motor, as shown in FIG. 5, is sufficient. The motor and the sensor have similar construction to make this calibration technique possible. A half-step is defined as being ½ of 15 degrees or 7 ½ degrees. In operation, selection is made from non-adjacent poles. Logic flow for simplified self auto calibration method for a regular motor starts at a logic flow block 60 and goes to a block 61 wherein there is initialized a pointer to the motor phase table. That is, one motor phase is chosen. Logic flow then goes to a block 62 wherein there is energized a single phase, a half-step forward, and the IPE is read and the pointer advanced. Logic flow then goes to a block 63 wherein two phases are energized, half-step forward and the IPE is read and the pointer advanced. Logic flow continues to a block 64 where there is a calculation of slope and offset which is stored in the calibration table. Logic flow then goes to decision block 65 where it is asked if all the line segments are done. If yes, logic flow ends at a block 66. If no, logic flow returns to the input of block 62 to continue logic processing.

However, when motor 3 is specifically designed to produce a very flat torque characteristic to reduce torque ripple, the normal half stepping of the total motor (both windings in this case) is not desirable because at the two-motor-phase-on, the detent torque exists over a large position, d, and an accurate position result cannot be obtained. Half-stepping by energizing only one side would produce smaller detent torque position, however, it may result in the sensor being physically pulled radially to one side, producing inaccurate IPE reading (see FIG. 2).

Figure 6:
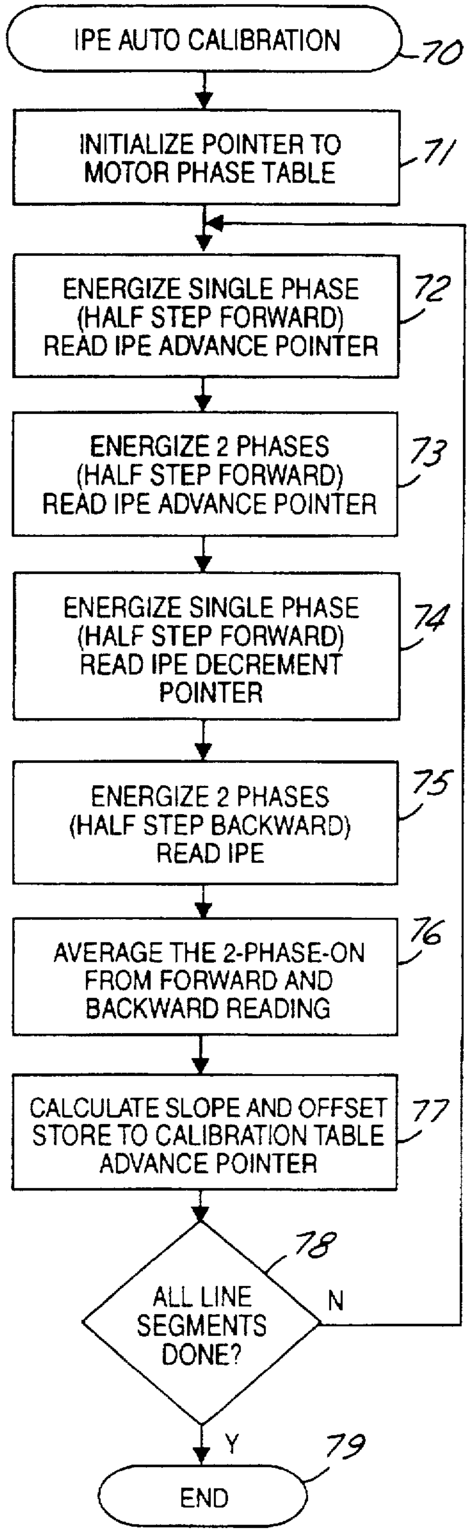
FIG. 6 is a logic block diagram of self auto-calibration for a double wound motor in accordance with an embodiment of this invention.

The method in accordance with an embodiment of this invention provides a more balanced motor calibration condition. That is, the motor radial forces are balanced. Such a method of self calibration is shown in FIG. 6. During half stepping when 2 phases are being energized, only the balanced phases, never the adjacent ones, are energized. First they are energized forward, say A1B2 (instead of A1B1) and IPE sensor is read, then the motor is half stepped forward, say C1C2, and then it's half stepped backward with A2B1 and IPE 2 sensor is read. At every half step, IPE 2 sensor is read for further processing. An average IPE 2 sensor value is derived from the forward and backward readings to compensate for any variations due to the soft detent position. The motor is stepped for a full revolution to obtain all the IPE 2 line segments. Slope and offset for each line segment are calculated from IPE 2 readings and stored into the semi-permanent memory, say Electrical Erasable Programmable Memory, in the microcontroller in TCU 1. This method can be applied to any motor with the above characteristics and in any position control systems other than the Electronic Throttle Control system described above.

Referring to FIG. 6, a self-auto calibration method for a motor an inductance position encoder (IPE), begins at a block 70 where there is the start of an IPE auto-calibration. Logic flow then goes to a block 71 wherein there is an initialization of a pointer to the motor phase table. Logic flow then goes to a block 72 where there is energized a single phase, half step forward, and the IPE is read and the pointer is advanced. Logic flow then goes to a block 73 where there are two phases energized, half step forward and the IPE is read and the pointer advanced. Logic flow then goes to a block 74 where there is a single phase energized, half step forward, the IPE is read and the pointer is decremented. Logic flow then goes to a block 75 where there are two phases energized, half step backward, and the IPE is read. Logic flow then goes to a block 76 where an average is calculated of the two phases on from forward and backward reading. Logic flow then goes to a block 77 wherein the slope and off set are calculated and are stored in the calibration table and the pointer is advanced. Logic then goes to a decision block 78 wherein it is asked if all line segments are done. If yes, logic flow goes to a block 79 which ends the calibration sequence. If no, logic flow goes back to the input of block 72 and the steps after 72 are repeated.

Various modifications and variations will no doubt occur to those skilled in the arts to which this invention pertains. Such variations which basically rely on the teachings through which this disclosure has advanced the art are properly considered within the scope of this invention.

We claim:

1. A method of auto-calibrating an inductance position encoder for an associated motor having a rotor with poles and a cooperating stator with poles, thus forming an encoder/motor combination, the method including the steps of:

selecting a motor phase in the motor of the encoder/motor combination by initializing a pointer to a motor phase table;

energizing the selected phase of the motor so as to move a first rotor pole of the motor into alignment with a first stator pole;

reading the electrical degree value of each of the three phases of the electrical wave functions of the encoder;

selecting two motor phases;

energizing the selected two motor phases so that the first rotor pole and a second rotor pole, adjacent to the first rotor pole, are rotated into an intermediate position between the first stator pole and a second stator pole, adjacent to the first stator pole;

reading the electrical degree value of each of the three phases of the encoder, thereby establishing two points for each of the three phases of the electrical wave functions of the encoder;

calculating the slope and offset for each of the three electrical wave functions of the encoder;

repeating this process until the electrical wave functions of the encoder are fully defined; and storing such electrical wave functions and using them as a calibration reference for the encoder.

2. A method of auto-calibrating an inductance position encoder for an associated motor having a rotor with poles and a cooperating stator with poles as recited in claim 1, the method further including the steps of:

selecting a previously selected phase of the motor;

energizing this previously selected phase to cause reverse rotation of the motor;

reading the electrical degree value of each of the three phases of the electrical wave functions of the encoder;

averaging the reading of the electrical degree value of the same positon of the motor when approached from a forward rotational direction and a reverse rotational direction; and establishing such average readings for adjacent motor positions thereby establishing two points for each of the three phases of the electrical wave functions of the encoder.

3. A method of a electronic throttle control for an internal combustion engine including the steps of:

mechanically coupling an inductance position encoder to a dual wound variable reluctance motor coupled by a shaft to the throttle body;

coupling an electronic throttle control unit to receive information from the inductance position encoder and to apply a control signal to the variable reluctance motor;

initializing a motor phase table;

energizing a single first phase of the motor;

reading the inductance position encoder;

updating the state of the motor in the table;

energizing two phases of the motor;

reading the inductance position encoder;

updating the table state of the motor;

energizing a single second phase of the motor;

reading an inductance position encoder;

updating the state of the motor;

energizing two phases of the motor;

reading an inductance position encoder;

averaging the readings of the inductance position encoder from the two-phases-on;

calculating the slope and offset and storing in a calibration table;

updating the state of the motor table; and repeating the above sequence until the motor rotor position versus inductance phase amplitude in all linear segments has been characterized.

4. An apparatus for calibrating an inductance position encoder including a dual wound variable reluctance motor mechanically coupled to a throttle body;

an inductance position encoder rotationally coupled to said dual wound variable reluctance motor;

an electronic throttle control unit coupled to said motor for applying actuating control signals and coupled to the inductance position encoder for receiving information from the inductance position encoder for processing; and said electronic throttle unit including control means for selectively energizing the phases of said motor and for receiving signals from said inductance position encoder so that the signals can be averaged for various positions of the motor.

5. An apparatus as recited in claim 4 wherein said motor includes two side windings wound to provide a flat torque curve.

* * * * *